3,280,080
COPOLYMERS OF MALEIC ANHYDRIDE AND
BICYCLO[2.2.1]HEPT-2-ENE
George H. Potter, St. Albans, and Nathan L. Zutty, Charleston, W. Va., assignors to Union Carbide Corporation, a corporation of New York
No Drawing. Filed Sept. 3, 1964, Ser. No. 394,328
2 Claims. (Cl. 260—78.5)

This invention relates to novel alternating copolymers. More particularly, it is concerned with the novel alternating copolymers of bicyclo[2.2.1]hept-2-enes and maleic anhydride.

The copolymerization of a mixture of at least two polymerizable ethylenically unsaturated monomers is known to produce polymers having a random structure. It has now been unexpectedly and surprisingly found that the copolymerization of a mixture of maleic anhydride (MA) and bicyclo[2.2.1]hept-2-enes (BCH) produces an alternating or uniform copolymer wherein the structure of the polymer consists essentially of equimolar amounts of the two monomers in an alternating sequence as follows . . . MA-BCH-MA-BCH-MA-BCH-MA-BCH- etc. This has been found to prevail even when the mole ratios of the bicyclo[2.2.1]hept-2-ene and maleic anhydride comonomers charged to the reactor have varied over the range of from about 1:9 to 9:1. It has also been observed that a third polymerizable monomer having the group $>C=CH_2$ can also be present in minor amount, up to about five mole percent of the total monomers, without seriously affecting the uniformity of the polymer produced. In such instances one still obtains an essentially alternating polymer. Illustrative of such monomers one can mention acrylonitrile, vinyl chloride, vinylidene chloride, styrene, methyl methacrylate, acrylic acid, vinyl acetate, methacrylonitrile, and many others known in the art. As used herein and in the claims, the term polymer encompasses copolymers produced from two or more monomers.

The copolymers of the instant invention can be produced with or without the presence of a free radical initiator. It has been observed, however, that at temperatures below about 30° C. the free radical initiator is preferably present. At temperatures above that value the polymerization can be readily carried out with or without the initiator being present.

The bicyclo[2.2.1]hept-2-enes that are copolymerized with maleic anhydride correspond to the formula:

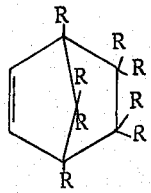

wherein each R represents a hydrogen atom or a hydrocarbyl radical having up to about 15 carbon atoms; as used herein the term hydrocarbyl radical defines a radical containing hydrogen and carbon atoms only. The hydrocarbyl radicals are alkyl radicals containing from 1 to about 15 carbon atoms such as methyl, ethyl, propyl, isopropyl, pentyl, octyl, 2-ethylhexyl, nonyl, decyl, dodecyl, pentadecyl, and the like; aryl radicals, such as phenyl, naphthyl, and the like; aralkyl radicals, such as benzyl, phenethyl, alpha mesityl, naphthal, and the like; alkaryl radicals, such as tolyl, xylyl, mesityl, methylnaphthyl, and the like; and cycloalkyl radicals, such as cyclobutyl, cyclopentyl, methylcyclopentyl, dimethylcyclopentyl, ethylcyclopentyl, cyclohexyl, methylcyclohexyl, cycloheptyl, and the like.

Illustrative of the bicyclo[2.2.1]hept-2-enes corresponding to Formula II, one can mention:

bicyclo[2.2.1]hept-2-ene,
1-methylbicyclo[2.2.1]hept-2-ene,
5-methylbicyclo[2.2.1]hept-2-ene,
7-methylbicyclo[2.2.1]hept-2-ene,
1-ethylbicyclo[2.2.1]hept-2-ene,
5-ethylbicyclo[2.2.1]hept-2-ene,
5-isopropylbicyclo[2.2.1]hept-2-ene,
5-pentylbicyclo[2.2.1]hept-2-ene,
5-heptylbicyclo[2.2.1]hept-2-ene,
5-(2-ethylhexyl)bicyclo[2.2.1]hept-2-ene,
7-octylbicyclo[2.2.1]hept-2-ene,
1-nonylbicyclo[2.2.1]hept-2-ene,
5-nonylbicyclo[2.2.1]hept-2-ene,
5-dodecylbicyclo[2.2.1]hept-2-ene,
5-pentadecylbicyclo[2.2.1]hept-2-ene,
5,5-dimethylbicyclo[2.2.1]hept-2-ene,
1,4-diisopropylbicyclo[2.2.1]hept-2-ene,
5,5-diisopropylbicyclo[2.2.1]hept-2-ene,
5,5-dibutylbicyclo[2.2.1]hept-2-ene,
5,5-dihexylbicyclo[2.2.1]hept-2-ene,
5-methyl-5-ethylbicyclo[2.2.1]hept-2-ene,
5,5-didecylbicyclo[2.2.1]hept-2-ene,
5,6-dimethylbicyclo[2.2.1]hept-2-ene,
5-methyl-6-ethylbicyclo[2.2.1]hept-2-ene,
5,6-dipropylbicyclo[2.2.1]hept-2-ene,
5,6-diisopropylbicyclo[2.2.1]hept-2-ene,
5,6-dipentylbicyclo[2.2.1]hept-2-ene,
5,6-di(2-ethylhexyl)bicyclo[2.2.1]hept-2-ene,
5,6-didodecylbicyclo[2.2.1]hept-2-ene,
5,5,6-trimethylbicyclo[2.2.1]hept-2-ene,
5,5,6-tripropylbicyclo[2.2.1]hept-2-ene,
5,5-dimethyl-6-ethylbicyclo[2.2.1]hept-2-ene,
5,5,6,6-tetramethylbicyclo[2.2.1]hept-2-ene,
5,5,6,6-tetraisopropylbicyclo[2.2.1]hept-2-ene,
5,5-dimethyl-6,6-diethylbicyclo[2.2.1]hept-2-ene,
1-phenylbicyclo[2.2.1]hept-2-ene,
5-phenylbicyclo[2.2.1]hept-2-ene,
7-phenylbicyclo[2.2.1]hept-2-ene,
5-naphthylbicyclo[2.2.1]hept-2-ene,
5,5-diphenylbicyclo[2.2.1]hept-2-ene,
5,6-diphenylbicyclo[2.2.1]hept-2-ene,
5,5,6-triphenylbicyclo[2.2.1]hept-2-ene,
2-benzylbicyclo[2.2.1]hept-2-ene,
5-benzylbicyclo[2.2.1]hept-2-ene,
5-phenethylbicyclo[2.2.1]hept-2-ene,
5,6-dibenzylbicyclo[2.2.1]hept-2-ene,
5-α-mesitylbicyclo[2.2.1]hept-2-ene,
5-naphthalbicyclo[2.2.1]hept-2-ene,
5-tolylbicyclo[2.2.1]hept-2-ene,
5,6-ditolylbicyclo[2.2.1]hept-2-ene,
5-xylylbicyclo[2.2.1]hept-2-ene,
5-methylnaphthylbicyclo[2.2.1]hept-2-ene,
5-cyclobutylbicyclo[2.2.1]hept-2-ene,
5,6-dicyclopentylbicyclo[2.2.1]hept-2-ene,
5-methylcyclopentylbicyclo[2.2.1]hept-2-ene,
5-isopropylcyclopentylbicyclo[2.2.1]hept-2-ene,
5-cyclohexylbicyclo[2.2.1]hept-2-ene,
and the like.

These hydrocarbyl substituted bicyclo [2.2.1] hept-2-enes are readily produced from cyclopentadiene or dicylopentadiene compounds and an alkene of the formula:

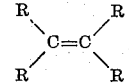

by the procedures set forth in United States Patent 2,340,908.

The polymerization reaction can be conducted in the presence of an inert liquid, which can be a solvent for either or both monomers, if desired. Suitable for use one can mention, for example, cyclohexanone, toluene, benzene, chlorobenzene, acetone, acetonitrile, ispropanol, heptane, octane, decane, refined kerosene, and the like.

The temperature of polymerization reaction can be from about 0° C. or lower to about 200° C. or higher, and is not narrowly critical. Preferred temperatures are from about 15° C. to about 150° C. The pressure can be subatmospheric, atmospheric or superatmospheric pressure and is not critical. Autogenous reactor pressures are preferred in a sealed system.

The polymerization can be carried out in the presence of a catalytic amount of a free radical initiator, said amount being sufficient to catalyze the polymerization reaction. The free radical initiators that can be employed are well known to the ordinary chemist skilled in the art, and the term "free radical initiator" has an established and recognized meaning to the skilled chemist. The catalytic amount can be varied from about 1 p.p.m. to about 10,000 p.p.m. or more, preferably, from about 1 p.p.m. to about 1,000 p.p.m., and most preferably from about 2 p.p.m. to about 200 p.p.m., based on the total amount of polymerizable monomers. Among the initiators suitable for use are those which initiate the formation of free radicals under the reaction conditions, such as molecular oxygen, peroxides, azo compounds, and so forth. The catalysts can be used singly or in combination. Illustrative are the azo type catalysts disclosed in the United States Patent 2,471,959; the peroxides, such as hydrogen peroxide, lauroyl peroxide, dipropionyl, peroxide, butyryl peroxide, benzoyl peroxide, acetyl peroxide, peracetic acid, di-tertiary-butyl peroxide, tertiary-butyl hydroperoxide, hydroxyheptyl peroxide, acetyl benzoyl peroxide, diethyl peroxide, succinoyl peroxide, urea peroxide, tetralin peroxide, and so forth; the alkali metal persulfates, perborates, and percarbonates; the ammonium persulfates, perborates, and percarbonates; diisopropyl peroxy-dicarbonate; and the like.

The high molecular weight copolymers are normally solids. They are useful as films and coatings for the production of molded and cast shaped articles, and other applications known and obvious to one skilled in the art. One of the interesting properties of these copolymers is their solubility in aqueous alkaline solution; thus enabling one to form coating compositions with an inexpensive, safe and readily available solvent.

The following examples, which are not to be construed as limiting this invention in any manner, further serve to illustrate the invention. Parts are by weight unless otherwise specified.

Example 1

There were charged 9.4 parts of bicyclo[2.2.1]hept-2-ene and 9.8 parts of maleic acid to a pressure tube. The tube was flushed with nitrogen, sealed, and agitated for 5.5 hours at 90° C. in a constant temperature bath. The alternating copolymer was recovered by adding the reaction mixture to heptane to precipitate the copolymer, which was filtered, washed with benzene and dried in vacuo at 50° C. There was obtained 5.9 parts of dry uniform, alternating bicyclo[2.2.1]hept-2-ene/maleic anhydride copolymer having an essentially equimolar ratio and a reduced viscosity of 0.11; determined at 30° C. using a solution of 0.2 g./100 ml. of cyclohexanone. The copolymer was readily cast by conventional means to a film and to fibers.

In a similar manner the following solid alternating copolymers are produced:

1-methylbicyclo[2.2.1]hept-2-ene/maleic anhydride,
5-ethylbicyclo[2.2.1]hept-2-ene/maleic anhydride,
5-(2-ethylhexyl)bicyclo[2.2.1]hept-2-ene/maleic anhydride,
1,6-dimethylbicyclo[2.2.1]hept-2-ene/maleic anhydride,
5,5-dimethylbicyclo[2.2.1]hept-2-ene/maleic anhydride,
5,6-dimethylbicyclo[2.2.1]hept-2-ene/maleic anhydride,
5-phenylbicyclo[2.2.1]hept-2-ene/maleic anhydride,
5-benzylbicyclo[2.2.1]hept-2-ene/maleic anhydride,
5-tolylbicyclo[2.2.1]hept-2-ene/maleic anhydride,
5-cyclobutylbicyclo[2.2.1]hept-2-ene/maleic anhydride,
5-cyclopentylbicyclo[2.2.1]hept-2-ene/maleic anhydride, and
bicyclo[2.2.1]hept-2-ene/1-methylbicyclo[2.2.1]hept-2-ene/maleic anhydride.

Example 2

In a manner similar to that described in Example 1, 4.1 parts of an essentially equimolar, alternating bicyclo[2.2.1]hept-2-ene/maleic anhydride copolymer was produced having a reduced viscosity of 0.46. The starting materials were 13.16 parts of bicyclo[2.2.1]hept-2-ene and 5.88 parts of maleic anhydride. A similar polymer is produced when four mole percent vinyl chloride is present in the initial charge of monomers.

In Examples 3 to 7 the procedure used was also similar to that of Example 1. As will be noted, however, catalyst was present in Examples 4 and 5 and solvent was present in Examples 4, 6 and 7.

| Example | 3 | 4 | 5 | 6 | 7 |
|---|---|---|---|---|---|
| BCH, parts | 1.88 | 141 | 9.4 | 49 | 70.5 |
| MA, parts | 17.6 | 49 | 9.8 | 47 | 73.5 |
| Solvent, parts by vol.: | | | | | |
| Toluene | | 40 | | | |
| Cyclohexanone | | | | 50 | 150 |
| Catalyst, parts: | | | | | |
| Diacetyl peroxide | | 0.95 | | | |
| Azobisisobutyronitrile | | | 0.2 | | |
| Temp., °C | 90 | 50 | 90 | 40 | 150 |
| Time, hrs | 5.5 | 26 | 2.5 | 240 | 0.5 |
| Yield, parts | 2.0 | 56 | 11.1 | 57 | |
| Reduced viscosity [1] | 0.15 | 0.27 | 0.14 | 0.44 | 0.10 |

BCH=bicyclo[2.2.1]hept-2-ene.
MA=maleic anhydride.
[1] Cyclohexanone solvent.

Example 8

A series of copolymerizations were carried out at 90° C. for a 5.5 hour period in which the mole ratio of the comonomers was varied. The results are set forth below:

| Run | a | b | c | d | e |
|---|---|---|---|---|---|
| Mole ratio of BCH:MA | 9:1 | 7:3 | 5:5 | 3:1 | 1:9 |
| Conversion [1] | 23.4 | 35.5 | 11.5 | 16.5 | 52.0 |
| Reduced viscosity [2] | | 0.46 | 0.17 | 0.2 | 0.15 |

[1] Based on lesser monomer component.
[2] Tetrahydrofuran solvent.

The carbon-hydrogen analysis of the alternate copolymers showed them to contain about equimolar amounts of the two monomers; the carbon and hydrogen analysis of the copolymers were within the experimental error range.

The copolymers of this invention contain the alternating unit represented by the following formula:

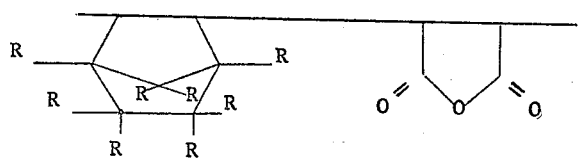

What is claimed is:

1. A normally solid alternating polymer of maleic anhydride and a bicyclo[2.2.1]hept-2-ene of the formula

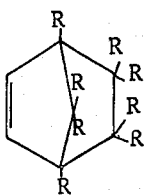

the structure of said alternating polymer being essentially made up of the alternating unit of the formula

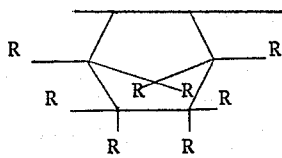 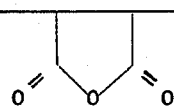

wherein R represents a member selected from the group consisting of hydrogen and a hydrocarbyl radical, said hydrocarbyl radical having from 1 to 15 carbon atoms and being selected from the group of alkyl, aryl, aralkyl, alkaryl and cycloalkyl radicals.

2. A normally solid alternating polymer of maleic anhydride and bicyclo[2.2.1]hept-2-ene essentially of the alternating unit structure of the formula

References Cited by the Examiner

UNITED STATES PATENTS 3,143,533   8/1964   Pledger _____ 260—78.5

JOSEPH L. SCHOFER, *Primary Examiner.*

L. WOLF, *Assistant Examiner.*